3,085,931
PLANT VIRUS GROWTH INHIBITORS

Walter A. Darlington, Dayton, Ohio, assignor to Monsanto Chemical Company, St. Louis, Mo., a corporation of Delaware
No Drawing. Filed Mar. 17, 1960, Ser. No. 15,533
7 Claims. (Cl. 167—33)

The invention relates to the inhibiton of the growth of viruses which attack plants, and more particularly to chemotherapy as applied to the control of plant viruses.

Viruses have been defined as submicroscopic intities capable of being introduced into specific living cells and reproducing inside such cells only. This definition summarizes the chief characteristic of viruses-small size, infectivity, host specificity, and complete dependence on the integrity of the host cell. The intimate relationship between the virus and the host cell is the most distinguishing feature of the virus, and mecessitates a more subtle approach to the chemotherapy of viruses than to that of other infectious agents, such as bacteria and fungi.

Although no intelligent estimate of the damages caused by plant viruses can be made, the problem is now being recognized as serious. Virus diseases are a serious problem in the farming of sugar beet, sugar cane, tomato, bean, cocoa, orange, tobacco, potato, peach, strawberry, raspberry, broccoli, cabbage hops and many flowers. In severe cases e.g. with peach and sugar beet, virus diseases may force abandonment of large areas for the cultivation of crops. In less severe cases, a virus disease may result in a decrease in yield and quality. It has been estimated that tobacco mosaic virus causes an annual loss of 40 million pounds of tobacco in the United States of America alone.

The great trade in seed potatoes amounting to half a million tons a year between England, Scotland and Ireland is based entirely on the prevalence of potato viruses and their aphis vectors in England. One potato virus alone, the ubiquitous potato virus X which in the United States used to be called the "healthy potato virus," is responsible for a loss of ten percent of the world's potato crop, while the losses of potatoes in Britain due to virus infection, have been put at one million tons per year. The grower of sugar-beets, especiaily in East Anglia, is only too familiar with "virus yellows" which, in an early season infection, may reduce sugar content by 50%.

The situation as regards the cabbage and broccoli crop becomes yearly more serious. There are two aphis-borne viruses which attack those plants causing them to be 'dwarfed and crinkled and prevent the formation of heart or curd.

Of flowering plants, possibly dahlias are the most seriously affected by viruses and, being propagated by tubers, the situation resembles in many ways the disastrous one which results from growing potatoes in England from home-saved "seed."

In the United States in addition to most of the viruses found in England there are several other important diseases such as curly-top of sugar beets and yellows of asters. Both the viruses causing these diseases have a wide host range and give rise to serious infections in many other crops.

In tropical regions there are many important virus diseases such as swollen-shoot of cocoa, phloemnecrosis of tea, rosette of ground-nuts and many others. A serious situation has arisen in the clove industry in Zanzibar where the clove trees have been dying in large numbers. The disease which causes the sudden collapse of vigorous trees has been called the sudden death disease and by a process of elimination of all other possible causes is now considered to be due to a virus.

Of all these tropical virus diseases, however, by far the most serious is "swollen shoot" of the cocoa tree. In the Gold Coast this virus disease probably started about 1920, although it has not till 1936 that reports were received of the "dying back" of large numbers of trees. At first there seemed to be only a few acres affected, but soon reports were received from many areas that the disease was spreading, and 10,000 trees were known to be dying. Up to 1939, trees were dying at the rate of one million a year. The annual rate between 1939 and 1945 was five million and between 1945 and 1948 it rose to fifteen million. It is clear that the cocoa industry will not long be able to survive losses on that scale.

Although the losses to viruses are impressive, few control measures have been developed. Of the curative measures investigated, selected inactivation of a virus by the application of heat is generally not practical, and chemotherapy has been used very little. Control of insect-transmitted virus direased by control of the insect vectors although attractive has not been too successful.

Other control measures of a negative nature are: destruction of infected plants (roguing); isolation from sources of infection; eradication of alternate hosts; use of healthy planting material; and use of disease-resistant varieties. Although these practices are adequate in certain cases, none is generally applicable and all have definite limitations.

It is an object of this invention to provide a chemical method of treating plants to inhibit the growth of viruses in the plants.

It is another object of this invention to provide a chemical method of treating plants to inhibit the growth of tobacco mosaic virus therein.

It is another object of this invention to provide chemical composoitions for treating plants to inhibit tobacco mosaic, local lesion, and ringspot virus activity.

These and other objects of the invention will become apparent as the detailed description of the invention proceeds.

According to the method of this invention, the growth of virus in plants is inhibited by treating the plants with a chemical compound of the 1-hydrocarbyl-2-pyrrolidone type having the general formula

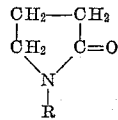

wherein R is an aliphatic hydrocarbyl radical having from 1 to 20 carbon atoms or soluble salts thereof. The R radical, i.e. the aliphatic hydrocarbyl radical can be a straight or a branched chain alkyl, alkenyl, alkadienyl or alkynyl radical. The hydrocarbyl radicals may also have substituents thereon, but such are not necessary to the activity of the compound. The salts of these compounds are also active, e.g., the hydrochloride, the nitrate, the sulfate, the dodecylbenzenesulfonic acid, the maleate, the fumarate salts, etc. However, in effect, treating the plants with a salt of an active compound is treating the plant with the compound itself, since the salt upon contact with water releases the compound which is the active virus inhibitor. Of this class of active virus-inhibitor chemicals, the preferred compounds are those wherein R is a long chain aliphatic saturated or unsaturated hydrocarbyl radical containing from 7 to 20 carbon atoms. Especially active as anti-virus agents are 1-decyl-2-pyrrolidone, 1-dodecyl-2-pyrrolidone, mixtures of 1-hexadecenyl-2-pyrrolidone, and 1-hexadecadienyl-2-pyrrolidone, said mixtures being made using amines derived from the unsaturated fatty acid fraction from tall oil distillation (normally consisting primarily of about equal portions of oleic and linoleic acids) and mixtures in which one or more of the hydrogens is in the 3, 4, and 5 positions on the pyrrolidone ring are replaced by methyl radicals. These materials can be diluted with inert liquid or solid carriers to concentrations as low as about 1 to 2 parts per million or possibly lower and still be effective. The particular concentration used may vary depending on the activity of the particular anti-viral agents. Normally these agents will be effective in concentrations in the range of about $10^{-3}$ to $10^{-5}$ molar concentrations. Those compounds having lower unsaturated hydrocarbyl groups possess a somewhat lower degree of anti-virus activity than those compounds containing lower saturated hydrocarbyl groups and those compounds containing the larger number of carbon atoms in the hydrocarbyl groups.

The virus-inhibiting chemical can be applied to the plants in a number of different ways, but it is preferred to apply it by spraying the plant foliage with a water solution or suspension of the chemical in at least a sufficient concentration to inhibit virus growth in the plant. The chemical compound can be applied to the plant by spraying, dipping in the case of potted plants, dusting with the chemical dispersed in an inert powder, or by other conventional means, e.g., systemically, i.e., where the chemical is applied indirectly to the plant by treating the soil whereby the chemical is absorbed by the plant through its root system. An additional method of applying would be by suspending small particles of the chemical in a stream of air or other gas, and spraying the plant with this suspension. The chemical can even be sprinkled on the plants in undiluted or powder form, if desired. In any event the invention does not lie in the particular method of treating the plant. Although these compounds are effective at low molar concentrations as stated above, higher concentrations will normally be used with the concentration being maintained below the level which will cause substantial phytotoxic injury to plants.

If the chemical is applied in water diluent and is soluble in water, of course no dispersant will be necessary, although a wetting agent may still be desirable for maximum effectiveness. If the chemical is not very soluble in water, an emulsifying agent may be required to keep it dispersed, e.g., alkylbenzenesulfonates, polyalkylene glycols, salts of sulfated long-chain alcohols, sorbitan fatty acid ester, etc., and other emulsifying agents which can be used and which are listed, e.g., in the U.S. Department of Agriculture bulletin No. E607. The active chemicals of the invention can also be applied, dissolved or dispersed in organic solvents, e.g., liquid hydrocarbons, provided they are substantially non-phytotoxic to the plants. If applied admixed with an inert pulverulent carrier, such carrier, as e.g., talc, bentonite, kieselguhr, diatomaceous earth, etc. can be used.

The following is a list of a number of the active chemical compounds of the invention. This list is given for the purpose of illustration only and is not meant to be limiting. Those compounds of this invention having saturated aliphatic hydrocarbyl groups are exemplified by the following:

1-methyl-2-pyrrolidone,
1-ethyl-2-pyrrolidone,
1-propyl-2-pyrrolidone,
1-hexyl-2-pyrrolidone,
1-octyl-2-pyrrolidone,
1-decyl-2-pyrrolidone,
1-dodecyl-2-pyrrolidone,
1-tetradecyl-2-pyrrolidone,
1-octadecyl-2-pyrrolidone,
1-dodecyl-3-methyl-2-pyrrolidone,
1-decyl-3,4,5-trimethyl-2-pyrrolidone,
1-eisodecyl-2-pyrrolidone,
1-pentaisopropyl-2-pyrrolidone and salts thereof.

Examples of unsaturated aliphatic hydrocarbyl radical containing compounds useful in this invention are:

1-(3-hexenyl)-2-pyrrolidone,
1-(2-octenyl)-2-pyrrolidone,
1-(2,4-decadienyl)-2-pyrrolidone,
1-(6-dodecenyl)-2-pyrrolidone,
mixtures of 1(9-hexadecenyl)-2-pyrrolidone and 1-(9,12-hexadecadienyl)-2-pyrrolidone,
1-(4-octynyl)-2-pyrrolidone,
1-(3-dodecynyl)-2-pyrrolidone,
1-(8-octadecynyl)-2-pyrrolidone,
1-(tetrapropenyl)-2-pyrrolidone,
1-(triisobutenyl)-2-pyrrolidone and salts thereof.

Salts of the compounds of the type listed above are also active anti-viral agents, but the active portion is the compound itself and not the salt portion. The pyrrolidone salts of the invention on contact with water hydrolyze releasing the pyrrolidone compound which is the active constituent. The salt in some cases can have the advantage of getting the substituted pyrrolidone compound into the plants more efficiently and so promoting the antivirus action. This can be particularly true of some of the organic salts such as the ones which will be illustratively mentioned below, since the organic salts will tend to hydrolyze more slowly than the inorganic salts mentioned. The following is a non-limiting list of the active salts useful in this invention: 1-methyl-2-pyrrolidone hydrochloride, 1-decyl-2-pyrrolidone nitrate, 1-dodecyl-2-pyrrolidone hydrochloride, 1-pentapropyl-2-pyrrolidone sulfate, mixtures of 1-(9-hexadecenyl)-2-pyrrolidone acetate and 1-(9,12-hexadecadienyl)-2-pyrrolidone acetate, 1-eisodecy-3,4-dimethyl-2-pyrrolidone hydrochloride, 1-hexadecyl-2-pyrrolidone dodecylbenzenesulfonate, 1-(6-tridecenyl)-2-pyrrolidone maleate, etc.

The 1-hydrocarbyl-2-pyrrolidone compounds can be prepared by several known methods. One such method involves heating an equimolar mixture of an aliphatic hydrocarbyl amine and a lactone first at 110–130° C. for about three hours and then at 250–270° C. for three to six hours while distilling off the water by-product. Any excess reactants can then be distilled under reduced pressure and the N-substituted pyrrolidone can be distilled. Yields range from 35% to 85% depending upon the pyrrolidone compound being prepared.

Leaf disc tests were made with several 2-pyrrolidone compounds: the most effective compounds for inhibiting the growth of virus were the 1-alkyl-2-pyrrolidone compounds as shown by the data given below. The test procedure involved inoculation of one leaf of healthy Turkish tobacco plant with the virus and after 24 hours, contact of portions of the inoculated leaf with the test compounds. Leaves were inoculated with Johnson tobacco virus by rubbing their entire surface with a gauze pad moistened with a phosphate buffer solution (pH 7.0) containing 200 µg. of the virus per milliliter. After inoculation the leaves were placed under a bell-jar with their petioles in water for 24 hours. At the end of this time, six 0.5″ discs were punched from each leaf, weighed, washed in water and the discs of each leaf placed in different test chemical in the desired concentration in 15 ml. of half-strength Vickery's solution (Vickery et al., Bull. Conn. Agr. Expt. Sta., 399, 1937) which had been prepared to have a final concentration of $5 \times 10^{-3}$ mole of $KH_2PO_4$. A "control" was prepared for each leaf by placing another set of six discs from the leaf into a Petri dish containing 15 ml. of the same Vickery's solution but no test chemical. The dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al., Arch. Biochem., Biophys., 27, 271 (1950), except that the final washing step thereof was omitted because it had been previously observed by us that this step in the isolation procedure results in some loss of virus. The colorimetric measurements were made at 750 mμ in a Coleman Universal Spectrophotometer and the amount of virus was read from a standard curve prepared with known amounts of tobacco mosaic virus.

The results of these tests employing this procedure for testing the inhibition of virus growth are reported in Table I below.

TABLE I

*Inhibition of Tobacco Mosaic Virus Multiplication in Leaf Discs*

| Compound | Molar Concentration | Percent Inhibition |
|---|---|---|
| A. 1-Methyl-2-pyrrolidone | $5 \times 10^{-4}$ | 83. |
|  | $10^{-4}$ | 47. |
| 1-Methyl-2-pyrrolidone | $5 \times 10^{-5}$ | 100. |
|  | $10^{-5}$ | 55. |
|  | $5 \times 10^{-6}$ | 33. |
| 1-Dodecyl-2-pyrrolidone | $5 \times 10^{-4}$ | 83. |
|  | $10^{-4}$ | 76. |
|  | $5 \times 10^{-5}$ | 53. |
|  | $4 \times 10^{-5}$ | 40. |
|  | $10^{-5}$ | 45. |
|  | $5 \times 10^{-6}$ | 33. |
| 2-pyrrolidone | $10^{-4}$ | no inhibition. |
| 2-pyrrolidinethione | $10^{-4}$ | Do. |
| 1-Benzoyl-2-pyrrolidone | $10^{-4}$ | Do. |

Since inoculation of the leaf precedes the treatment by 18–20 hours, this test is a measure of the ability of a compound to inhibit tobacco mosaic virus (TMV) multiplication after the virus has become established in the host tissue.

The results, reported in Table I, show that those compounds having an aliphatic hydrocarbyl radical attached to the 2-pyrrolidone nucleus are effective virus growth inhibitors whereas those having no such radical are not effective at the indicated concentrations.

The two most active compounds listed in Table I were also subjected to additional testing on whole plants and the decrease in local lesions observed on those plants treated with the chemical as compared to "control" plants which had no chemical treatment. The host plants used in testing the inhibition of tobacco mosaic virus were tobacco plants (*Nicotiana glutinosa*). A typical test is described in the following paragraph.

Plants of the same size and age are divided into equal groups of controls and experimentals. The smaller and older leaves are removed from plants (only the primary leaves are used in the case of the bean plants) leaving only leaves of approximately equal size which are to be used in the experiment. These leaves are dusted lightly with Carborundum. Then the leaves are inoculated by painting them lightly with a virus solution or an extract from a virus-infected plant. One hour later the experimental plants are sprayed with the test solutions which were aqueous solutions containing the chemical in the desired concentration and about 1% of a non-ionic surface active agent "Atlox 1256" reputed to be a tall oil and ethylene oxide condensation product. The plants are then kept in the greenhouse for 3 to 6 days during which time numerous discrete local lesions appear on the inoculated leaves. The lesions are counted and by comparison with the number of lesions on the control (untreated) plants, the effectiveness of the particular chemical in inhibiting the multiplication of the virus is determined.

Local lesion tests were run to extend the results obtained in the leaf disc test to whole plants. The concentrations of chemicals used and the conditions of the experiments were chosen arbitrarily and do not necessarily represent conditions for maximum effect. The results of these local lesion tests are summarized in Table II, which follows.

TABLE II

*Inhibition of Local Lesion Production by 1-Substituted-2-Pyrrolidone Compounds*

| Compound | Molar Concentration | Percent change in local lesion counts |
|---|---|---|
| 1-Methyl-2-pyrrolidone | $10^{-4}$ | −27 |
| 1-Dodecyl-2-pyrrolidone | $10^{-4}$ | −41 |

The data described above demonstrate the high and unexpected activity of the chemical compounds of the invention in inhibiting the growth of plant viruses. It has been shown experimentally that tobacco mosaic virus is inhibited by the present method, and since viruses are quite similar chemically it would be expected that viruses generally would be controlled by the method. For example, tobacco mosaic virus is reported (Textbook of Biochemistry, by Harrow, B., fifth edition, 1950, pp. 79–84) to be a conjugated protein containing about 95% protein and 5% nucleic acid; bushy stunt virus appears to contain 83% protein and 17% of nucleic acid, and tobacco ring spot virus contains 60% protein and 40% nucleic acid.

Although the invention has been described in terms of specified examples which are set forth in considerable detail, it should be understood that this is by way of illustration only and that the invention is not necessarily limited thereto, since alternative embodiments will become apparent to those skilled in the art, in view of the disclosure. Particularly, it should be recognized that the claimed compounds and the salts thereof are equivalent since a salt on contact with water will hydrolyze releasing the compound itself, which is the active antiviral agent, so actually treating the plants with the salt is in effect treating the plants with the compound itself. Accordingly, modifications are contemplated which can be made without departing from the spirit of the described invention.

What is claimed is:

1. The method of inhibiting the multiplication of plant virus comprising applying to living plants a virus-growth inhibiting quantity of a 1-hydrocarbyl-2-pyrrolidone of the formula

wherein R is an alkyl radical having from 1 to 20 carbon atoms.

2. The method of claim 1, wherein said plants are tobacco plants and the virus is tobacco mosaic virus.

3. The method of claim 1 wherein the 1-hydrocarbyl-2-pyrrolidone compound is 1-methyl-2-pyrrolidone.

4. The method of claim 1 wherein the 1-hydrocarbyl-2-pyrrolidone compound has from 8 to 20 carbons in the hydrocarbyl group.

5. The method of claim 4 whichin the 1-hydrocarbyl-2-pyrrolidone compound is 1-dodecyl-2-pyrrolidone.

6. An anti-viral composition comprising water, an emulsifying agent, and a member of the group consisting of a 1-hydrocarbyl-2-pyrrolidone of the formula

wherein R is an alkyl radical of from 1 to 20 carbon atoms, and salts thereof which release the compound itself on contact with water.

7. A virus-growth inhibiting composition comprising an oil-in-water emulsion of a member selected from the group consisting of 1-hydrocarbyl-2-pyrrolidone of the formula $$\begin{array}{c} CH_2\text{---}CH_2 \\ | \quad\quad | \\ CH_2 \quad C=O \\ \diagdown \diagup \\ N \\ | \\ R \end{array}$$

wherein R is an alkyl radical of from 1 to 20 carbon atoms, and salts thereof which release the compound itself on contact with water.

References Cited in the file of this patent

King, W. V.: Chemicals Evaluated as Insecticides and Repellants at Orlando, Fla., U.S. Dept. of Agriculture Handbook No. 69, May 1954, p. 302.

Chemical Abtracts, vol. 31, page 2172.